United States Patent [19]

Dezael et al.

[11] 3,943,228

[45] Mar. 9, 1976

[54] PROCESS FOR EFFICIENTLY PURIFYING INDUSTRIAL GAS

[75] Inventors: Claude Dezael, Maisons-Laffitte; Jean-Pierre Poitevin, Marly-le-Roi; Philippe Renault, Noisy-le-Roi, all of France

[73] Assignee: Institut Francais du Petrole, des Carburants & Lubrifiants, Paris, France

[22] Filed: Nov. 27, 1973

[21] Appl. No.: 419,383

[30] Foreign Application Priority Data

Nov. 27, 1972 France .............................. 72.42158

[52] U.S. Cl. ............. 423/237; 204/102; 204/180 P; 423/242
[51] Int. Cl.² .......................................... C01C 3/00
[58] Field of Search ........... 423/237, 242, 512, 547; 204/93, 101, 102, 180 P

[56] References Cited

UNITED STATES PATENTS

| | | | |
|---|---|---|---|
| 1,986,889 | 1/1935 | Fulton | 423/547 |
| 1,992,681 | 2/1935 | Conway et al. | 423/547 |
| 2,862,789 | 12/1958 | Burgess | 423/242 |
| 3,510,253 | 5/1970 | Fattinger et al. | 423/242 |
| 3,515,513 | 6/1970 | Parsi | 423/242 |
| 3,645,671 | 2/1972 | Griffin et al. | 423/547 |
| 3,676,059 | 7/1972 | Welty | 423/242 |

FOREIGN PATENTS OR APPLICATIONS

| | | | |
|---|---|---|---|
| 826,221 | 1959 | United Kingdom | 423/242 |
| 1,104,583 | 1968 | United Kingdom | 423/242 |
| 356,757 | 1931 | United Kingdom | 423/547 |

OTHER PUBLICATIONS

J.E. Jordan et al.–$SO_2$ Removal from Stockgases–4/73.

*Primary Examiner*—Oscar R. Vertiz
*Assistant Examiner*—Eugene T. Wheelock
*Attorney, Agent, or Firm*—Millen, Raptes & White

[57] ABSTRACT

Sulfur dioxide and ammonia remaining in waste-gas after partial purification thereof, for example by means of ammonia or ammonium sulfite solutions, are withdrawn from said gas by washing with a diluted aqueous solution of ammonium sulfate; the resulting ammonium sulfite containing solution is oxidized thereafter either by means of air or in an electrochemical cell.

8 Claims, 2 Drawing Figures

FIG.1
FIG.2
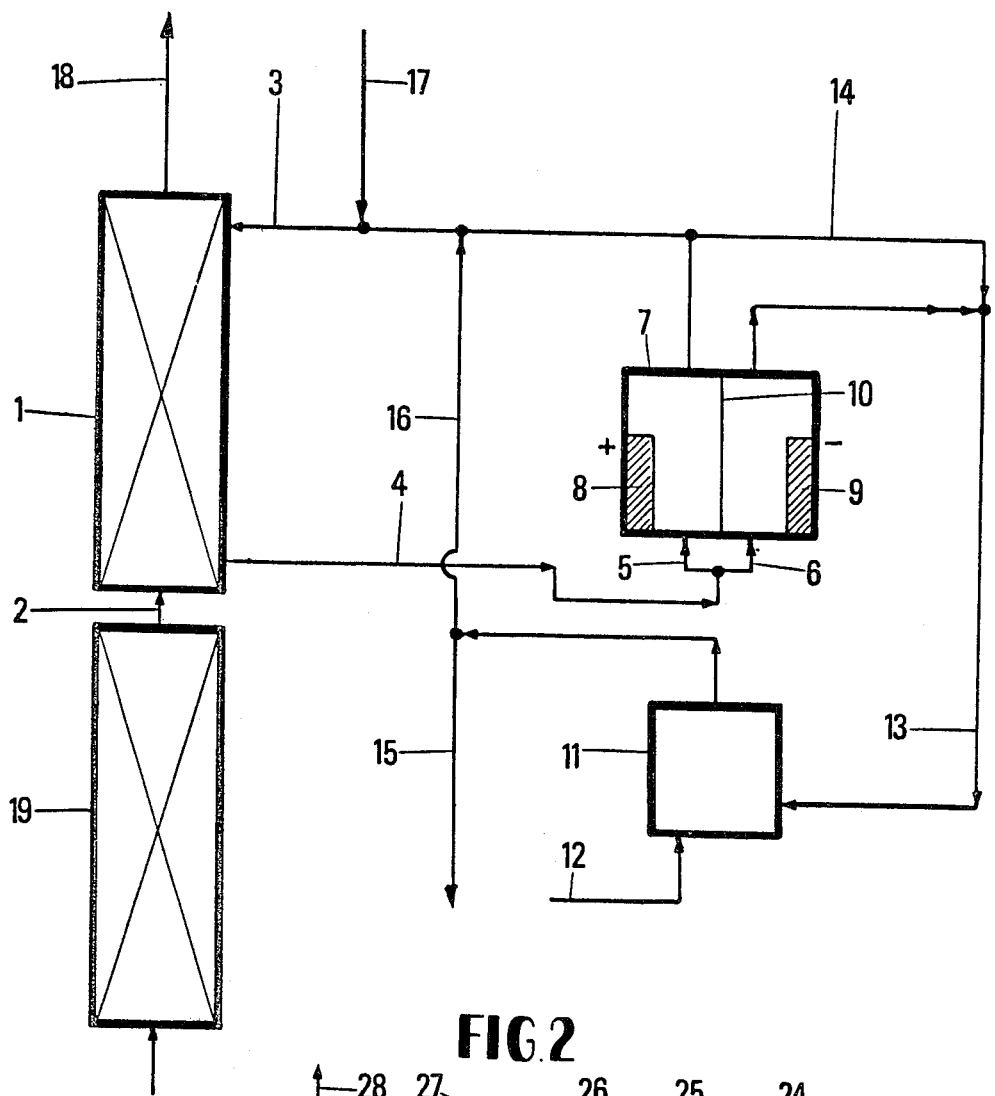
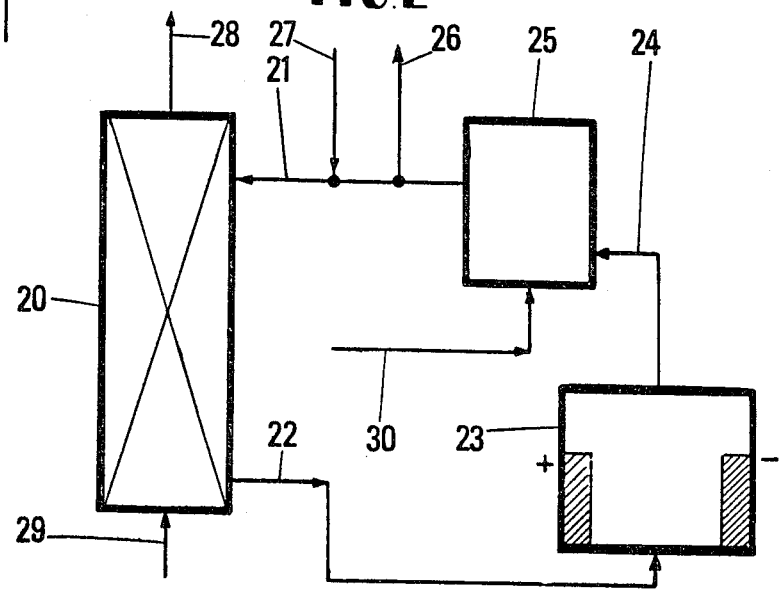

PROCESS FOR EFFICIENTLY PURIFYING INDUSTRIAL GAS

This invention concerns efficiently removing residual sulfur dioxide and ammonia from, for example, waste-gas previously purified by means of aqueous ammonia-containing solutions, so as to be made free of the major part of the sulfur oxides contained therein.

It is known that many industrial waste-gases, for example the waste-gases from power plants and some effluent gases from chemical plants, contain sulfur dioxide and in some cases sulfur trioxide which are major pollutants for the atmosphere. Their treatment with aqueous solutions of ammonia or ammonium sulfites results in an efficient purification thereof and in the production of aqueous solutions of ammonium salts of oxygen and sulfur containing acids, which solutions may be easily converted to sulfur, a product which may be stored easily, is not polluting and may be used in industry.

There still remain, however, in the resultant scrubbed gases, small amounts of sulfur dioxide and ammonia which may result in a wreath of smoke at the stack outlet. Sufficient reheating of the evolved gas could reduce or suppress this wreath of smoke, but this would be a costly operation.

We have now found that when the gases previously purified by any of the above means were thereafter washed with a dilute aqueous solution of ammonium sulfate, they could be made substantially free of any residual sulfur dioxide and ammonia, thereby avoiding the formation of smoke attributable to the ammonium salts.

The respective amounts of sulfur dioxide and ammonia in the gas evolved from the purification stage and which must be treated are usually less than 300 ppm and, in most cases, in the range of from 50 to 250 ppm by volume.

The process of the invention consists of contacting a gas containing small amounts of sulfur dioxide and ammonia with a diluted aqueous solution of ammonium sulfate, so as to obtain a solution containing ammonium sulfites whose major part will be oxidized, in order to transform the relatively volatile sulfites to sulfates which are stable compounds.

The contact between the gas and the ammonium sulfate solution may be carried out in an apparatus separate from that used for the preliminary purification of the gas with aqueous ammonia-containing solutions. Alternatively a multistage column may be used, the washing step according to the invention being carried out in the upper section with liquid discharge from the bottom of this upper section.

The temperature at the outlet from the purification stage is about from 40° to 70°C, usually 50°C, i.e. close to the dew point of the waste-gas.

This temperature is convenient for the purpose of the invention and does not need modification. However, a slight cooling in this zone, which favors the coalescence of entrained liquid droplets, improves the washing performance.

Relatively large amounts of washing solution may be used at such rates that the ammonium sulfite concentration is very low, i.e. has a value of about 0.02 to 0.5 mole per liter, preferably 0.05 mole per liter at the outlet of the washing zone.

During the contact of the aqueous solution with the gas, sulfur dioxide and ammonia dissolve and produce in the resulting solution a mixture of ammonium neutral sulfite and ammonium hydrogen sulfite in variable proportions, depending on the composition of the treated gas. In the described conditions, this solution is very dilute, and the oxidation of the sulfites to ammonium sulfate may be obtained without any difficulty, said sulfate being not liable to decompose when the solution is recirculated.

Now, in order to carry out this oxidation under good conditions, it is advantageous to sufficiently enrich the solution with ammonium neutral sulfite. If the gas treated does not contain sufficient ammonia, additional ammonia may be supplied, for example, either as gas or as aqueous solution, in order to make the medium subject to oxidation slightly basic.

The conventional oxidation methods, for example the techniques according to which air or a gaseous oxygen-containing mixture is bubbled, the electrochemical techniques or the catalytic methods may be used.

There is thus obtained a solution containing substantially only ammonium sulfate, which is recycled to the zone of contact with the purified gas up to obtaining a sulfate content between 0.5 and 3 moles per liter, preferably about 1 mole per liter. This concentration is controlled by periodically or continuously withdrawing a small amount of solution from the circuit, this amount being, for example, about one-twentieth of the circulating volume, and replacing it, if desired, with water.

This withdrawn purge solution may be without inconvenience fed to the zone of gas purification since it contains only sulfate and a small amount of ammonium sulfite.

The reactor in which the oxidation is carried out may be provided, for example, with one or more perforated plates or with a packing, so as to improve, when bubbling is desired, the contact between the gas flow and the circulated solution.

Oxidation catalysts are helpful, for example cobalt, iron, nickel, manganese or vanadium salts.

Ashes produced by burning a heavy fuel, for example fuel-oil, contain some of these metals and may be used by dispersing them through the circulated solution.

Another method consists of electrochemically oxidizing the sulfites to sulfate in an electrolytic cell which may be provided with a cation-permeable membrane between the anodic and cathodic compartments.

The cell is fed with the ammonium sulfite solution; it is provided, on the anode side, with corrosion-free metal electrodes, for example of lead, silver, platinum or alloys containing at least one of these metals; on the cathode side, the electrodes may be made of these metals or of less noble metals, such as nickel, copper, iron or steel.

The cation-permeable membrane may consist of a cation-exchange material or an organic material such as, for example, cross-linked polystyrene sulfonate, linked to a film-forming base material.

A partial oxidation of the sulfites to sulfate occurs in the anodic compartment of the cell, said oxidation being enhanced, if necessary, for example, by bubbling air through the solution. if a membrane is used, the solution contained in the cathode compartment is converted to a solution of neutral ammonium sulfite by means of the $NH_4^+$ ions which have passed through the membrane. This solution may then be easily oxidized to ammonium sulfate; this oxidation may be carried out by passing the neutral sulfite solution through an additional reactor in which, for example, air is bubbled.

Conditions for rapid oxidation of the sulfites may be achieved by modifying, if necessary, the pH of the solution by adding thereto a make-up quantity of the solution issued from the anode compartment, so that the pH value is maintained below, for example, about 9.

The purge fraction may be usefully collected at this point of the circuit.

The following examples, given in non-limitative manner, illustrate the invention.

EXAMPLE 1 (FIG. 1)

An absorption column (19) in which a $SO_2$-containing waste gas is treated with an aqueous ammonia-containing solution ($NH_3$ + ammonium sulfites) is provided at its upper part with an additional stage 1 for washing the purified fumes containing 200 ppm of $SO_2$ and 150 ppm of $NH_3$ by volume.

This additional zone, where the temperature is about 50°C, is fed from line 2 with 100,000 $Nm^3$ per hour of waste gas.

The aqueous solution employed for absorbing $SO_2$ and $NH_3$ from the waste-gas and whose composition is given hereinafter is supplied from line 3 to the upper part of this zone and is withdrawn through line 4 from the lower part thereof.

Its composition is then 4.6 g per liter of ammonium sulfite and its flow rate 20 $m^3$ per hours. It is fed through lines 4, 5 and 6 to the oxidation reactor 7 which comprises an electrolytic cell provided with platinum electrodes (anode 8, cathode 9) on which the current density is 40 milliamperes per $cm^2$ and whose anode and cathode compartments are separated by a membrane 10 of Permion 1010.

The $(NH_4)_2SO_3$ solution, withdrawn through line 13 from the cathode compartment of the cell and whose pH has been brought to about 8 by means of material supplied through line 14 from the anode compartment, is passed to the reactor 11, through which air supplied from line 12 is bubbled.

There is thus obtained a solution containing 83 g of $(NH_4)_2SO_4$ per liter, from which about 1.3 $m^3$ per hour are discharged through line 15, the remainder being fed through line 16 to the absorber.

The solution recovered at the outlet of the cell (anodic side) also contains 83 g of ammonium sulfate per liter when the plant is in running condition. It is fed back through line 3 to the purification zone 1. About 1.3 $m^3$ per hour of water is supplied from line 17.

The waste-gas discharged through stack 18 contains only 12 ppm of $SO_2$ by volume and is free of ammonia. 1.2 $m^3$ per hour of water and 97 liters per hour of 10 M ammonia are supplied through line 17.

The pumps and valves of the plant and the direct current generator feeding the electrolytic cell have not been shown.

EXAMPLE 2 (FIG. 2)

The conditions of concentration and feed rate are the same as in example 1, but the electrolytic cell is not provided with a cation-permeable membrane.

The partially purified waste-gas is fed from line 29 to the absorber 20. The ammonium sulfate solution used for washing the fumes is fed to the absorber through line 21 and is discharged through line 22. It goes through the electrolytic cell 23, in which the electrode current density is 100 milliamperes/$cm^2$, and is discharged through line 24. It is fed to a reactor 25 through which air supplied from line 30 is bubbled, and subsequently discharged and fed back to the absorber 20 through line 21.

Line 26 is used for withdrawing a fraction of the solution and line 27 for supplying additional water. The waste-gas is discharged through stack 28.

The results are the same as in example 1, except that the solution discharged through line 26 at a rate of 1.1 $m^3$/hour contains 81.6 g of ammonium sulfate per liter.

EXAMPLE 3

Example 1 is repeated, except that the electrolytic cell is not present and is replaced by a unit for oxidation by air in the presence of a cobalt catalyst.

The effluent is partly fed back to zone 1 and partly discharged.

The resulting purified waste-gas contains less than 10 ppm of $SO_2$ and less than 10 ppm of $NH_3$ by volume.

What we claimed is:

1. A process for efficiently removing sulfur dioxide and ammonia from an industrial waste gas containing each of them in a proportion lower than about 300 ppm by volume, comprising the steps of:
   a. contacting the waste gas with a dilute aqueous solution of ammonium sulfate, to absorb sulfur dioxide and ammonia and form ammonium sulfites dissolved in said dilute ammonium sulfate solution at a concentration of about 0.02–0.5 mole of ammonium sulfite per liter;
   b. separating resultant purified gas from the solution obtained in step (a);
   c. dividing the separated solution into separate portions;
   d. passing a first portion of separated solution to the anodic compartment of an electrochemical cell having a cation-permeable membrane separating the anodic compartment from the cathodic compartment, and passing a second portion of said separated solution to the cathodic compartment of said cell and electrolyzing said portions in said compartments to convert sulfite to sulfate in the anodic compartment and transfer ammonium ions through said cation-permeable membrane to produce a solution of neutral ammonium sulfite in the cathodic compartment;
   e. discharging the solution of neutral ammonium sulfite from the cathodic compartment and thereafter contacting it with a molecular oxygen containing gas, thereby converting said neutral ammonium sulfite to ammonium sulfate;
   f. admixing at least a fraction of the solution discharged from the anodic compartment with at least a fraction of the solution discharged from the cathodic compartment and subsequently contacted with a molecular oxygen containing gas; and
   g. recycling at least a portion of said admixed fractions to the step (a) as the dilute aqueous solution of ammonium sulfate.

2. A process according to claim 1, wherein a portion of the admixed solutions of step (f) is discharged and water is added to the recycled portion of step (g).

3. A process according to claim 1 wherein the dilute aqueous solution of ammonium sulfate has a concentration of about 1 mole per liter.

4. A process according to claim 1, wherein the ammonium sulfate concentration of the solution of step (a) is in the range of from 0.05 to 3 moles per liter.

5. A process according to claim 1, wherein the waste gas is a gas obtained by washing a sulfur dioxide containing gas by means of an aqueous solution of ammonia or ammonium sulfite.

6. a process according to claim 1, wherein the contact of step (a) is carried out counter-currently.

7. A process according to claim 1, wherein the waste gas contains 50–250 ppm by volume of sulfur dioxide and 50–250 ppm by volume of ammonia.

8. A process according to claim 1, wherein the contact of step (a) is carried out at a temperature of 40°–70°C.

* * * * *